(12) United States Patent
Phan

(10) Patent No.: US 10,268,785 B2
(45) Date of Patent: Apr. 23, 2019

(54) NOISE DETECTION DEVICE

(71) Applicant: TOYOTA JIDOSHA KABUSHIKI KAISHA, Toyota-shi, Aichi-ken (JP)

(72) Inventor: Vinh Long Phan, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 15/254,614

(22) Filed: Sep. 1, 2016

(65) Prior Publication Data

US 2017/0091352 A1    Mar. 30, 2017

(30) Foreign Application Priority Data

Sep. 25, 2015   (JP) .................................. 2015-188562

(51) Int. Cl.
*G06F 17/50* (2006.01)
*G06F 17/13* (2006.01)

(52) U.S. Cl.
CPC .......... *G06F 17/5009* (2013.01); *G06F 17/13* (2013.01); *G06F 17/5095* (2013.01); *G06F 2217/16* (2013.01); *Y02T 90/50* (2018.05)

(58) Field of Classification Search
None
See application file for complete search history.

(56) References Cited

U.S. PATENT DOCUMENTS

| | | | |
|---|---|---|---|
| 5,604,893 A * | 2/1997 | Burnett | G06F 17/5018 345/419 |
| 2013/0116997 A1 * | 5/2013 | Sun | G06F 17/5018 703/9 |
| 2017/0199950 A1 * | 7/2017 | Sun | G06F 17/5009 |

FOREIGN PATENT DOCUMENTS

| | | |
|---|---|---|
| JP | 2011-252853 A | 12/2011 |
| JP | 2013-134742 A | 7/2013 |
| JP | 2014-016308 A | 1/2014 |

* cited by examiner

*Primary Examiner* — Craig C Dorais
(74) *Attorney, Agent, or Firm* — Oliff PLC

(57) ABSTRACT

A CPU uses a simulation in which a vehicle model is made to run to calculate the amplitude of pressure variations generated on the surface of the vehicle model for each location on the vehicle model surface, and to calculate a mean surface flow velocity, which is a time average at a predetermined time of the flow rate of a fluid on the vehicle model surface, for each position on the surface of the vehicle model. The CPU also calculates an acoustic intensity for the respective locations on the vehicle model surface based on the calculated amplitude of the pressure variations and on the calculated mean surface flow velocity, and, by performing surface integration on the calculated acoustic intensities on the vehicle model surface, also calculates an acoustic power, which is the total energy of the sound emitted from the vehicle model surface.

3 Claims, 5 Drawing Sheets

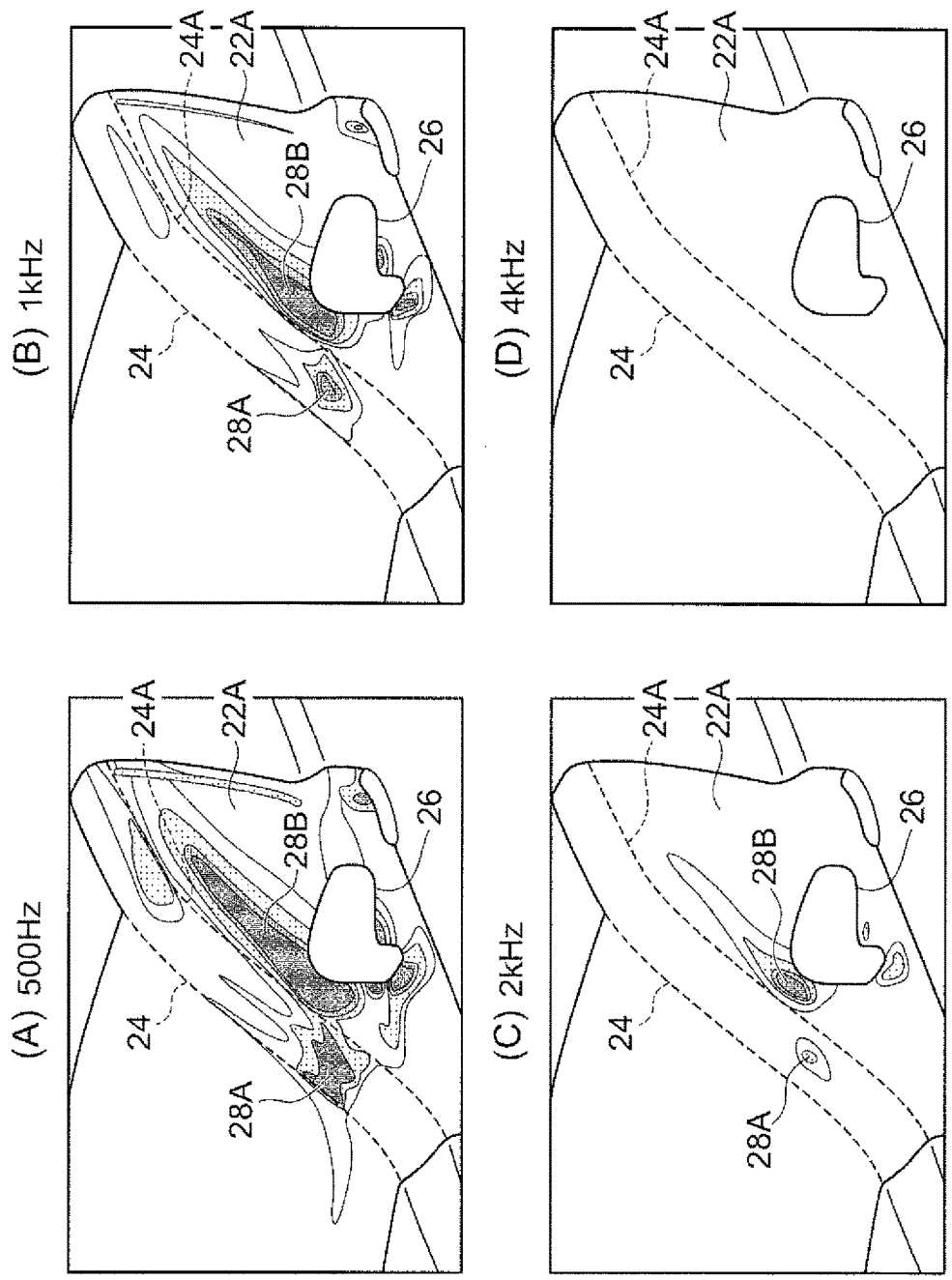

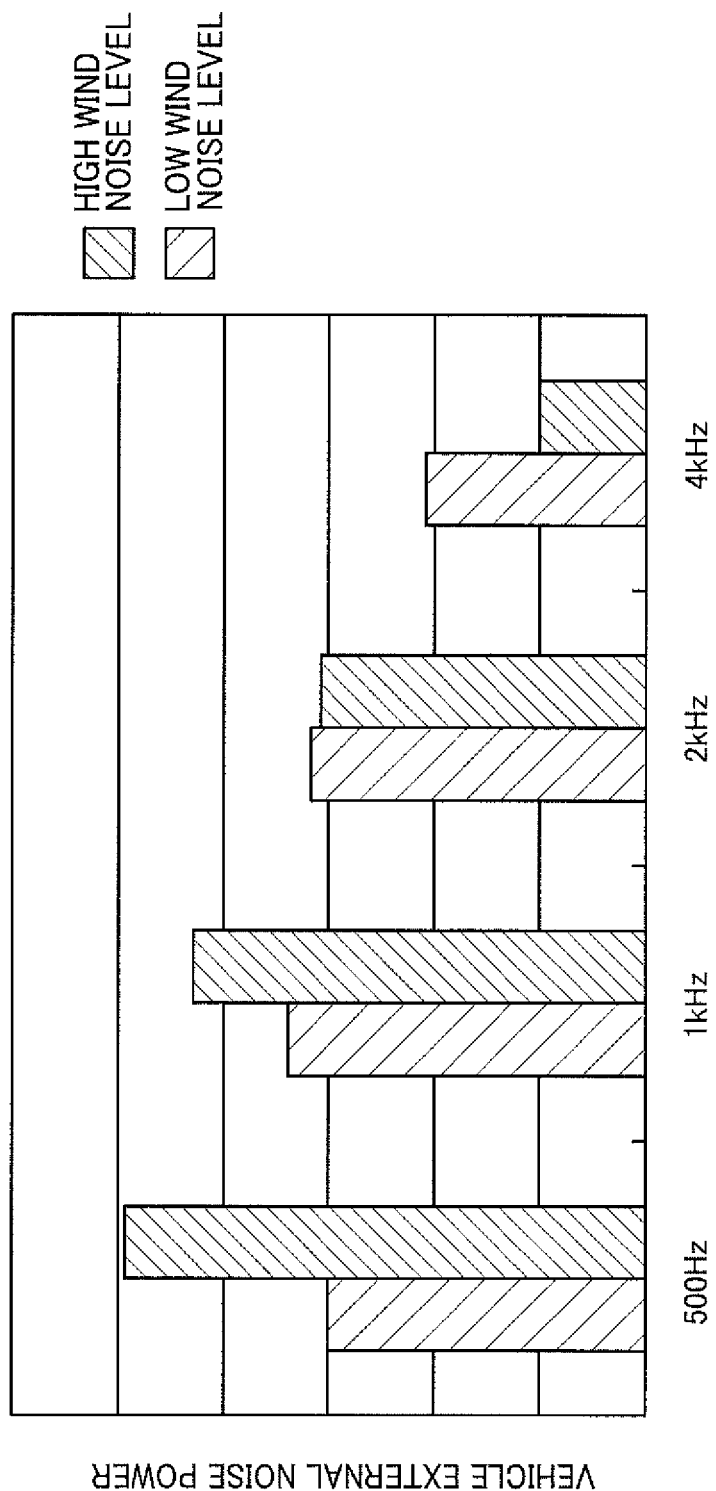

NOISE DETECTION DEVICE

CROSS-REFERENCE TO RELATED APPLICATION

This application is based on and claims priority under 35 USC 119 from Japanese Patent Application No. 2015-188562 filed on Sep. 25, 2015, the disclosure of which is incorporated by reference herein.

BACKGROUND

Technical Field

The present invention relates to a noise detection device that is based on computational fluid dynamics (CFD).

Related Art

Noise levels generated by a running vehicle are sometimes measured using microphone arrays installed in the ceiling and in the side walls of a wind tunnel laboratory, and microphones installed inside the vehicle cabin. However, because the microphone arrays installed respectively in the ceiling and the side walls are located at a distance from the surface of the vehicle providing the noise source, it has been difficult to precisely pinpoint the location of the noise source. Furthermore, in the microphones installed inside the vehicle cabin, the problem arises that the location of the source of wind noise from outside the vehicle is obstructed by the vehicle glass and the front pillars and, consequently, cannot be pinpointed.

Independently of the noise measurements carried out in a wind tunnel laboratory, noise levels generated by a running vehicle can also be calculated using CFD. In Japanese Patent Application Laid-Open (JP-A) No. 2013-134742 (Patent document 1), there is disclosed an invention relating to a method of predicting an aerodynamic noise level in which the pressure distribution on the surface of the side window glass of a vehicle model when the vehicle is running is calculated using CFD, and the level of the aerodynamic noise generated in the vicinity of the front pillars is predicted based on this pressure distribution.

The invention described in Patent document 1 predicts the level of aerodynamic noise generated in the vicinity of the front pillars, however, no consideration is given to predicting the aerodynamic noise level in any arbitrary location on the vehicle surface. Moreover, the invention described in Patent document 1 predicts the level of the aerodynamic noise generated in the vicinity of the front pillars based on the size of an area where the calculated negative pressure level exceeds a predetermined value, however, this invention still has the problem that it remains difficult to quantitatively calculate the strength of the source of the noise from the negative pressure level.

In CFD, it is comparatively easy to calculate what is known as the flow field. This is the calculation of the flow rate, density, and pressure of air, which is a fluid, on the surface of a vehicle model. Based on the calculation of the flow field, physical quantities such as pressure variations, the vorticity, and Lighthill's acoustic source isosurfaces and the like on the surface of that vehicle model can be calculated. However, although these physical properties are able to schematically show the trend of sound pressure changes in the noise from variations in the flow of the fluid, they do not enable the noise itself to be quantitatively calculated. Therefore, there is a concern that they are not suitable to be used to quantitatively evaluate the size of the noise.

Moreover, in CFD, in some cases, the aforementioned calculation of the flow field and the quantitative calculation of the noise are performed simultaneously. However, in order to perform these calculations, immense calculation resources and calculation times are required.

SUMMARY

The present invention was conceived in view of the above-described circumstances, and it is an object thereof to provide a noise detection device that quantitatively calculates the strength of a wind noise source at each location on the surface of a vehicle.

A noise detection device according to a first aspect of the present invention is provided with a numerical fluid dynamics processing unit that, using a simulation in which a vehicle model having fixed design specifications is made to run, calculates an amplitude of pressure variations generated on a surface of the vehicle model at each location on the surface of the vehicle model, and that also calculates a mean surface flow velocity, which is a time average at a predetermined time of the flow rate of a fluid on the vehicle model surface, for each position on the surface of the vehicle model. This noise detection device is also provided with an acoustic strength calculation unit that, based on the amplitude of the pressure variations at each location on the vehicle model surface and on the mean surface flow velocity at each location on the vehicle model surface that were each calculated by the numerical fluid dynamics processing unit, calculates an acoustic intensity for the respective locations on the vehicle model surface, and that, by performing surface integration on the calculated acoustic intensities on the vehicle model surface, calculates an acoustic power, which is the total energy of the sound emitted from the vehicle model surface.

According to the noise detection device according to the first aspect, a simulation in which a vehicle model having fixed design specifications is made to run is executed by a numerical fluid dynamics processing unit, and the amplitude of pressure variations that are generated on the vehicle model surface is calculated for each location on that particular vehicle model surface. In addition, the numerical fluid dynamics processing unit also calculates a mean surface flow velocity, which is a time average of the flow rate of a fluid on the vehicle model surface for each location on that vehicle model surface.

Moreover, according to the noise detection device according to the first aspect, an acoustic strength calculation unit calculates an acoustic intensity based on the amplitude of the pressure variations and on the mean surface flow velocity at each location on the vehicle model surface that were calculated by the numerical fluid dynamics processing unit. Furthermore, by performing surface integration on the calculated acoustic intensities on the vehicle model surface, the acoustic strength calculation unit also calculates an acoustic power, which is the total energy of the sound emitted from the vehicle model surface.

In this way, according to the noise detection device according to the first aspect, by calculating the acoustic intensity from the amplitude of the pressure variations and the mean surface flow velocity at each location on the vehicle model surface, which can be calculated comparatively easily via CFD, it is possible to quantitatively calculate the strength of a wind noise source at each location on the vehicle surface. Moreover, by calculating the acoustic power from the acoustic intensity, it is possible to quantitatively calculate the total energy of the noise emitted from the vehicle model surface.

The noise detection device according to a second aspect is characterized in that, in the first aspect, for each location on the vehicle model surface, the acoustic strength calculation unit calculates a square of the sum of the amplitude of the pressure variations and the mean surface flow velocity at identical locations on the vehicle model surface, and based on the square of the sum of the amplitude of the pressure variations and the mean surface flow velocity calculated for each location on the vehicle model surface, calculates the acoustic intensity for each location on the vehicle model surface.

According to the noise detection device according to the second aspect, by calculating the acoustic intensity based on the square of the sum of the amplitude of the pressure variations and the mean surface flow velocity calculated for each location on the vehicle model surface, it is possible to quantitatively calculate the strength of sources of wind noise at each location on a vehicle surface.

The noise detection device according to a third aspect is characterized in that, in the first or second aspects, there is further provided an image processing unit that plots on the vehicle model surface the acoustic intensities at each location on the vehicle model surface that were calculated by the acoustic strength calculation unit, so as to visualize the acoustic intensities at each location on the vehicle model surface.

According to the noise detection device according to the third aspect, by plotting on the vehicle model surface the acoustic intensities at each location on the vehicle model surface so as to visualize these acoustic intensities, it is possible to quantitatively display the strength of sources of wind noise at each location on a vehicle surface.

The noise detection device according to a fourth aspect is characterized in that, in any one of the first through third aspects, the numerical fluid dynamics processing unit calculates the amplitude of the pressure variations at each location on the vehicle surface model in each one of predetermined frequency bands, and the acoustic strength calculation unit calculates the acoustic intensity at each position on the vehicle model surface and the acoustic power generated on the vehicle model surface in each one of the predetermined frequency bands.

According to the noise detection device according to the fourth aspect, by calculating the acoustic intensity and the acoustic power at each position on a vehicle model surface in each one of predetermined frequency bands, it is possible to quantitatively calculate the strength of sources of wind noise at each location on a vehicle surface in each frequency band.

The noise detection device according to a fifth aspect is characterized in that, in any one of the first through fourth aspects, the respective locations on the vehicle model surface include a front window and a side window.

According to the noise detection device according to the fifth aspect, it is possible to quantitatively calculate the strength of sources of wind noise that are generated by height differences in a vehicle model surface such as those created by a front window and a side window and the like.

As has been described above, according to the noise detection device according to the present invention, it is possible to quantitatively calculate the strength of a wind noise source at each location on the surface of a vehicle.

BRIEF DESCRIPTION OF THE DRAWINGS

Exemplary embodiments of the present disclosure will be described in detail based on the following figures, wherein:

FIG. 4 is a schematic view showing examples of an acoustic intensity in respective frequency bands plotted on the surface of the vehicle model in an embodiment of the present invention, and shows the acoustic intensity on the surface of the vehicle model when the frequency is 500 Hz in (A), when the frequency is 1 kHz in (B), when the frequency is 2 kHz in (C), and when the frequency is 4 kHz in (D).

FIG. 5 is a schematic view showing an example of the vehicle external noise power in the respective frequency bands calculated by the noise detection device according to an embodiment of the present invention.

DETAILED DESCRIPTION

Figure 1:
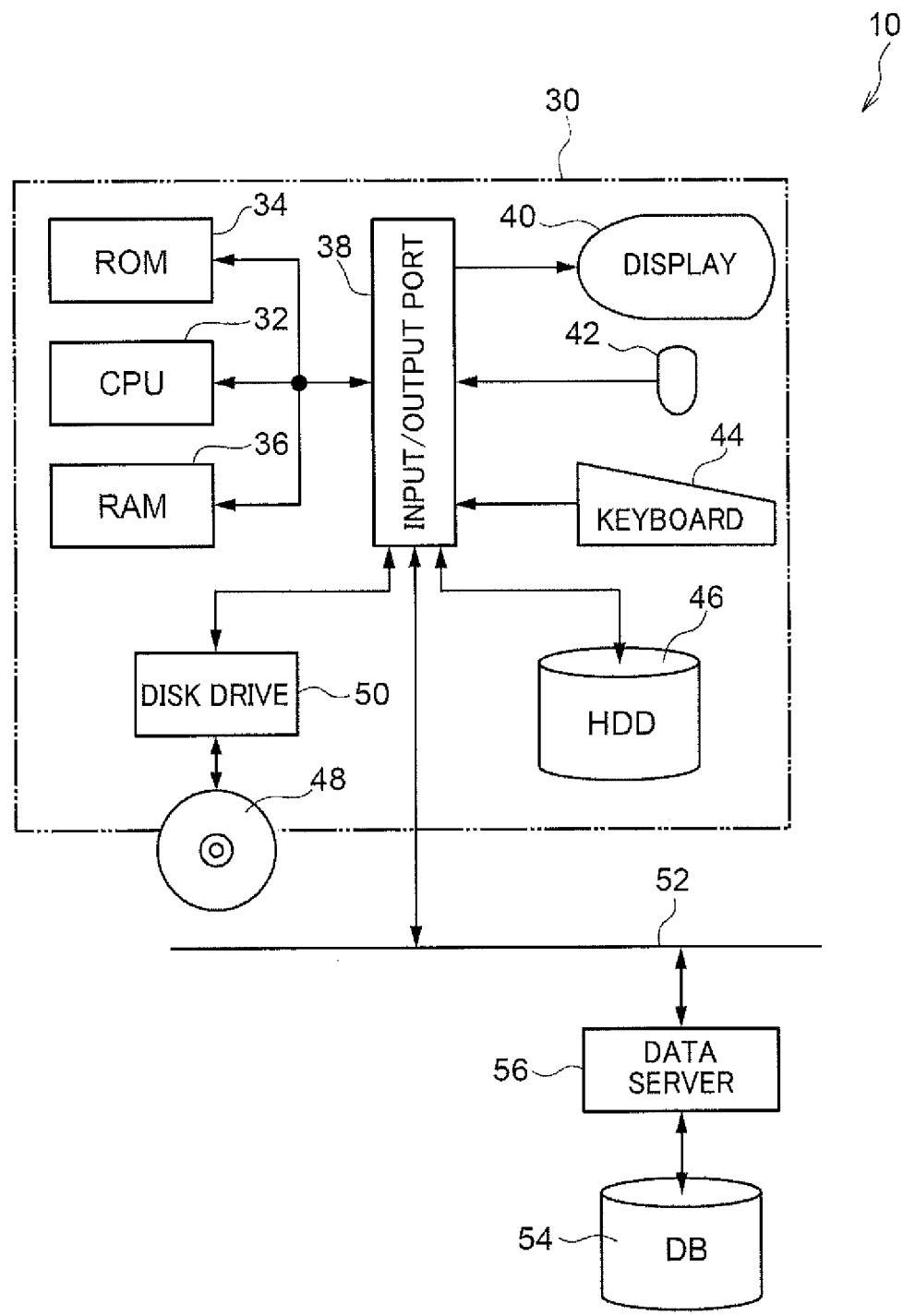
FIG. 1 is a block diagram showing an example of the specific structure of a noise detection device according to an embodiment of the present invention.

Hereinafter, a noise detection device 10 according to the present embodiment will be described using FIG. 1 and FIG. 2. FIG. 1 is a block diagram showing an example of the specific structure of the noise detection device 10 according to an embodiment of the present invention.

The noise detection device 10 incorporates a computer 30 in its structure. The computer 30 is provided with a CPU 32, ROM 34, RAM 36, and an input/output port 38, and has sufficient capabilities to perform arithmetic processing using a CFD solver (described below). As an example, it is desirable for the computer 30 to be of a type that can execute high-level arithmetic processing at high speeds, such as an engineering work station, or a supercomputer or the like.

In the computer 30, the CPU 32, the ROM 34, the RAM 36, and the input/output port 38 are connected to each other via various types of bus such as an address bus, a data bus, and a control bus and the like. Various types of input/output devices such as a display 40, a mouse 42, a keyboard 44, a hard disk (HDD) 46, as well as a disk drive 50 that reads information from various types of disks (for example, CD-ROM and DVD and the like) 48 are connected to the input/output port 38.

A network 52 is also connected to the input/output port 38 so that information can be exchanged with various types of devices that are connected to the network 52. In the present embodiment, a data server 56 to which a database (DB) 54 is connected is also connected to the network 52 so that information can also be exchanged with the DB 54.

Data for a 3D model of the vehicle that is to be subjected to noise detection, as well as data and the like that are supplied to the CFD arithmetic processing are stored in advance in the DB 54. This storing of information in the DB 54 may be achieved by registering it using the computer 30 and data server 56, or by registering it using another device that is connected to the network 52. The data for the 3D model that is registered in the DB 54 may be computer aided design (CAD) data for a vehicle, or may be data having previously adjusted geometry in order to simplify the arithmetic processing in the CFD performed by the CFD solver.

In the present embodiment, a case is described in which data for a 3D model of the vehicle that is to be subjected to noise detection, and data and the like that are supplied to the CFD arithmetic processing are stored in the DB 54 that is connected to the data server 56, however, it is also possible to store the information held in the DB 54 in the HDD 46 that is built into the computer 30 or in an external storage device such as an external hard disk or the like.

A CFD solver, which is a program that makes it possible to perform CFD arithmetic processing and also to perform a simulation that is based on the CFD arithmetic processing, as well as a program that calculates the strength of the noise source are preinstalled on the HDD 46 in the computer 30. In the present embodiment, as a result of the CPU 32 executing the CFD solver and the program that calculates the strength of the noise source, the strength of the wind noise that makes each location on the surface of a vehicle into a noise source is quantitatively calculated. In addition, as a result of the CPU 32 plotting the strength of the quantitatively calculated noise at each position on the surface of the vehicle model (described below), the strength of the wind noise sources can be visualized and displayed on the display 40. Note that several methods may be used in order to preinstall the CFD solver and the program that calculates the strength of the noise of the present embodiment on the computer 30. For example, the CFD solver and the program that calculates the strength of the noise may be stored on a CD-ROM or DVD or the like together with a setup program, and this disk is then inserted into the disk drive 50. When the CPU 32 executes the setup program, the CFD solver and the program that calculates the strength of the noise are installed on the HDD 46. Alternatively, it is also possible to install the CFD solver and the program that calculates the strength of the noise on the HDD 46 by means of communication with other information processing devices that are connected to the computer 30 via a public telephone line or via the network 52. Note that it is not necessary for the CFD solver and the program that calculates the strength of the noise to be mutually separate programs, and they may also be in the form of a single unified program.

Figure 2:
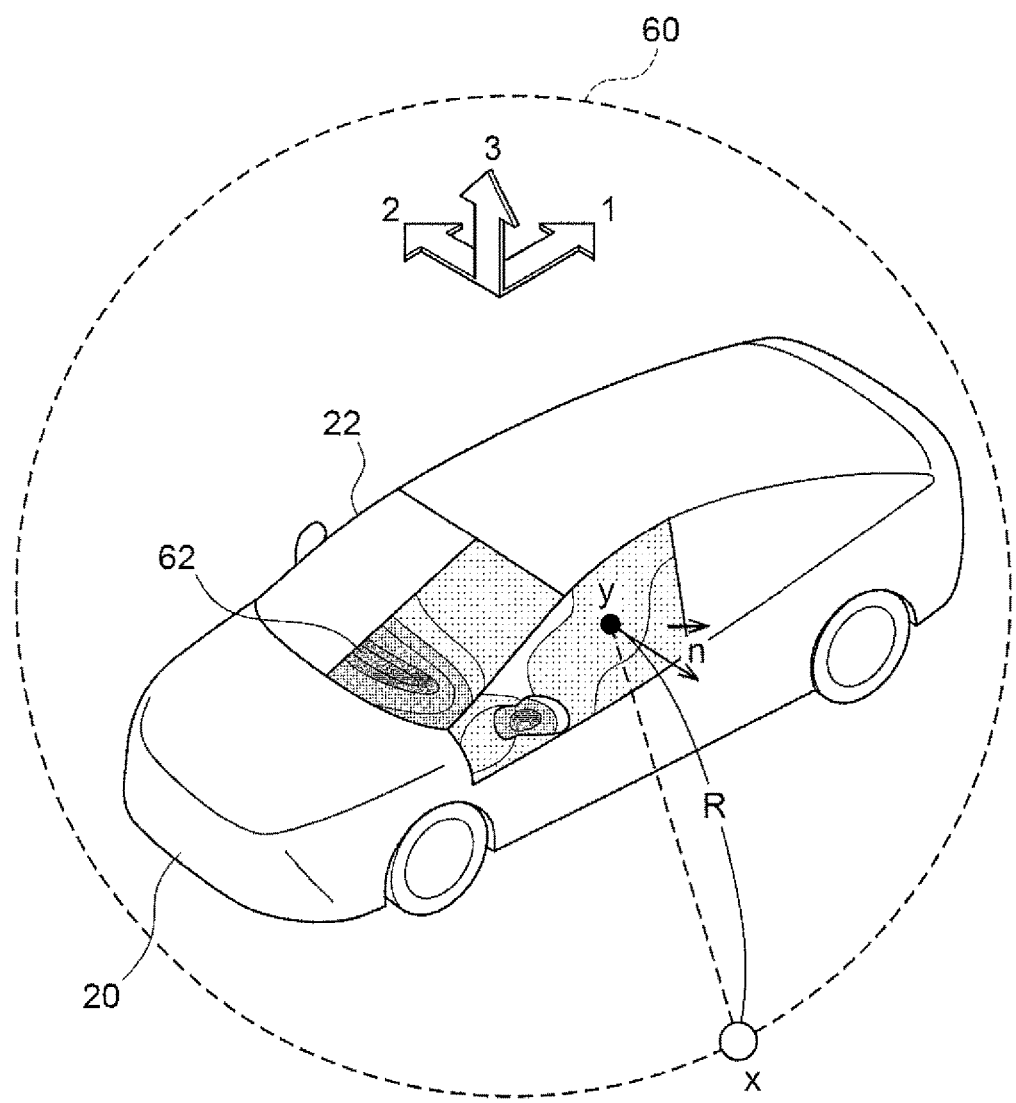
FIG. 2 is a conceptual diagram showing an example of a vehicle, and of a model of a noise source generated when this vehicle is running of the noise detection device according to an embodiment of the present invention.

FIG. 2 is a conceptual diagram showing an example of a vehicle, and of a model of a noise source generated when this vehicle is running of the noise detection device 10 according to the present embodiment. In FIG. 2 an example is shown of a noise source area 62, which depicts the sources of noise (i.e., wind noise) that are caused by running wind, on a front window 22 of a vehicle model 20, and that are extracted by means of arithmetic processing performed by the noise detection device according to the present embodiment.

In the present embodiment, based on 3D data for a vehicle obtained via CAD having fixed design specifications, the vehicle model 20 is represented three-dimensionally using data obtained by adjusting the geometry of the aforementioned 3D data such that it can be processed by a CFD solver. Spatial coordinates of a space that contains the vehicle model 20 shown in FIG. 2 are each expressed by directions 1, 2, and 3. In the present embodiment, spatial directions are expressed by i (−1, 2, 3). 1 is a positive coordinate indicating a direction moving from a point of origin towards the rear of the vehicle, 2 is a positive coordinate indicating a direction moving from a point of origin towards the right side of the vehicle, and 3 is a positive coordinate indicating a direction moving upwards from a point of origin. As an example, the point of origin may be the center of gravity of the vehicle model 20. In the present embodiment, as is described below, it is assumed that an acoustic energy integration area (Closed_Surface) 60 is located a satisfactory distance from the vehicle model 20. Based on this assumption, approximation is performed in order to deal with the vehicle model 20 as a point in the acoustic energy integration area (Closed_Surface) 60. Consequently, the definition of the point of origin is not limited to the aforementioned center of gravity, and, for example, might also be an intermediate position between the head portion of a seated occupant of the driver's seat and the head portion of a seated occupant of the front passenger seat in the vehicle model 20.

By performing a simulation in which the vehicle model 20 is running, the amplitude of pressure variations at each location on the surface of the vehicle model 20, and the mean surface flow velocity at each location on the surface of the vehicle model 20 are calculated. Furthermore, by calculating the acoustic intensity, which is the strength of the sound at each location on the surface of the vehicle model 20, based on the amplitude of the pressure variations at each location on the surface of the vehicle model 20, and on the mean surface flow velocity at each location on the surface of the vehicle model 20, the strength of the wind noise sources is quantitatively calculated. Furthermore, by performing surface integration on the calculated acoustic intensity, the acoustic power, which is the total energy of the sound emitted from the surface of the vehicle model 20, is calculated.

In the present embodiment, the acoustic energy integration area (Closed_Surface) 60, which is a spherical area centered on the center of gravity of the vehicle model 20, is assumed, and a point x on the acoustic energy integration area 60 is taken as a sound pressure evaluation point for the noise generated from the vehicle model 20. In addition, a point y on the surface of the vehicle model 20 is taken as a measurement point for the surface pressure that is generated by running wind on the surface of the vehicle model 20. The distance between the aforementioned sound pressure evaluation point x and the surface pressure measurement point y is defined as R, and a unit normal vector n is defined at the surface pressure measurement point y.

In the present embodiment, the following variables are set in the spaces defined in the manner shown in FIG. 2.

| List of Variables | |
|---|---|
| $p_{sp}(x, t)$ | Sound pressure at time t at sound pressure evaluation point x on the acoustic energy integration area |
| $x_i$ | i direction coordinates of sound pressure evaluation point x on the acoustic energy integration area |
| $y_i, y'_i$ | i direction component of surface pressure measurement points y, y' on vehicle model surface |
| $n_i, n'_i$ | i component of unit normal vector of surface pressure measurement points y, y' |
| c | speed of sound (343 m/s) |
| R | distance between $x_i$ and $y_i$ ($R = |x_i - y_i|$) |
| P (y, t) | surface pressure at measurement point y |
| ω | angular frequency |
| f | frequency |
| $S_{correlation}$ | correlation area |
| $L_{correlation}$ | correlation distance |
| I | vehicle external noise power distribution (acoustic intensity) |
| W | vehicle external noise power |
| ρ | air density |

Of the above variables, the vehicle external noise power distribution I shows what is known as the sound strength, and is the acoustic power transmitted per unit area. The vehicle external noise power W is a value showing the total energy of the noise (i.e., wind noise) emitted from the surface of the vehicle model 20, and corresponds to an integrated value of the vehicle external noise power distribution I.

In the present embodiment, by calculating the vehicle external noise power distribution I and the vehicle external noise power W from the results of the CFD arithmetic processing, the strength of the sources of wind noise outside the vehicle model 20 is calculated, and the location of these noise sources can be visualized by being reproduced by means of computer graphics (CG).

As has been stated above, in CFD it is comparatively easy to calculate what is known as the flow field, which is the calculation of the flow rate, density, and pressure of air, which is a fluid, on the surface of the vehicle model 20. For example, pressure variations on the surface of the vehicle model 20, and the mean surface flow velocity, which is the mean flow rate of the air flowing over the surface of the vehicle model 20 can be calculated comparatively easily by a number of CFD solvers.

The pressure variations on the surface of the vehicle model 20 correlate to the source of the wind noise, however, they do not show the actual wind noise source itself. In the present embodiment, using Formulae (10) and (11), which are derived in the following manner, the vehicle external noise power distribution I, which provides an index for the wind noise source, and the vehicle external noise power W are calculated.

Firstly, based on Curie's formulation, the sound pressure $p_{sp}$ (x, t) at the far field observation point x is defined by the following Formula (1).

$$p_{sp(x,t)} = \frac{1}{4\pi} \sum_{i=1}^{3} \int_S \frac{(x_i - y_i)}{cR^2} \left[\frac{\partial P(y,t)}{\partial t}\right] n_i dS(y). \quad (1)$$

Next, the acoustic intensity (i.e., the vehicle external noise power distribution) I at the observation point x is defined by the following Formula (2).

$$I = \frac{p_{sp(x,t)}^2}{\rho c} \quad (2)$$

Based on the above Formulae (1) and (2), Formula (3) is derived. Formula (3) calculates the vehicle external noise power (i.e., the acoustic intensity integration) W (t) in the acoustic energy integration area (Closed_Surface) 60, which is the long-range closed surface shown in FIG. 2. Note that $y_i'$ is an i direction coordinate of the surface pressure measurement point y' which correlates to the surface pressure measurement point y.

$$W(t) = \oiint \frac{p_{sp(x,t)}^2}{\rho c} dS(x)_{Closed\_Surface} \quad (3)$$

$$= \frac{1}{16\pi^2 \rho c^3} \oiint \left\{ \sum_{i=1}^{3} \int_S \frac{(x_i - y_i)}{R^2} \left[\frac{\partial P(y,t)}{\partial t}\right] n_i dS(y) \times \right.$$

$$\left. \sum_{i=1}^{3} \int_{S'} \frac{(x_i - y_i')}{R^2} \left[\frac{\partial P'(y',t)}{\partial t}\right] n_i' dS'(y') \right\} dS(x)_{Closed\_Surface}$$

$$= \frac{1}{16\pi^2 \rho c^3} \oiint \sum_{i=1}^{3} \int_S \int_{S'} \frac{(x_i - y_i)}{R^2} \frac{(x_i - y_i')}{R^2} \left[\frac{\partial P(y,t)}{\partial t}\right]$$

$$\left[\frac{\partial P'(y',t)}{\partial t}\right] n_i' n_i dS(y) dS'(y') dS(x)_{Closed\_Surface}$$

The acoustic energy integration area (Closed_Surface) 60 is located at a sufficient distance from the vehicle model 20. Therefore, if the vehicle model 20 is treated as a point in the acoustic energy integration area (Closed_Surface) 60, then the following approximation is possible.

$$(x_i - y_i)(x_i - y_i') \propto x_i^2$$

If the above approximation formula is assigned to Formula (3), then the following Formula (4) is obtained.

$$W(t) = \qquad (4)$$

$$\frac{1}{16\pi^2 \rho c^3} \oiint \sum_{i=1}^{3} \int_S \int_{S'} \frac{x_i^2}{R^4} \left[\frac{\partial P(y,t)}{\partial t}\right] \left[\frac{\partial P'(y',t)}{\partial t}\right] n_i' n_i dS(y) dS'(y')$$

$$dS(x)_{Closed\_Surface}$$

The correlation area $S_{correlation}$ is now defined. The correlation area $S_{correlation}$ is a grouping of pressure variations of the surface pressure measurement point y' which correlates to the surface pressure measurement point y. Because $S_{correlation} \ll 1$, the following relationship is established.

$$\begin{cases} n_i' \approx n_i \\ y' \approx y \\ \frac{\partial P'(y',t)}{\partial t} \approx \frac{\partial P(y,t)}{\partial t} \end{cases}$$

From the above relationship, Formula (4) can be transformed in the following manner.

$$W(t) = \frac{1}{16\pi^2 \rho c^3}$$

$$\oiint \left\{ \sum_{i=1}^{3} \int_S \frac{x_i^2 n_i^2}{R^4} \left[\frac{\partial P(y,t)}{\partial t}\right]^2 S_{correlation}(y) dS(y) \right\} dS(x)_{Closed\_Surface}$$

If the sequence of the integration in the above formula is changed, then the following Formula (4-1) is obtained.

$$W(t) = \frac{1}{16\pi^2 \rho c^3} \quad (4\text{-}1)$$

$$\sum_{i=1}^{3} \int_S \oiint \frac{x_i^2 n_i^2}{R^4} dS(x)_{Closed\_Surface} \left[\frac{\partial P(y,t)}{\partial t}\right]^2 S_{correlation}(y) dS(y)$$

Moreover, based on the surface area of the sphere and the internal area of the vector, the results shown in Formula (4-2) are obtained.

$$\begin{cases} \oiint dS(x)_{Closed\_Surface} = 4\pi R^2 \\ \sum_{i=1}^{3} \overline{x_i^2 n_i^2} = \overline{(\vec{x}, \vec{n})^2} = \frac{R^2}{3} \end{cases} \quad (4\text{-}2)$$

$$\therefore \sum_{i=1}^{3} \oiint \frac{x_i^2 n_i^2}{R^4} dS(x)_{Closed\_Surface} = \frac{4\pi}{3}$$

If the calculation results from Formula (4-2) are substituted into Formula (4-1), then the following vehicle external noise power calculation formula is obtained.

$$W(t) = \frac{1}{12\pi\rho c^3} \int_S \left[\frac{\partial P(y,t)}{\partial t}\right]^2 S_{correlation}(y) dS(y)$$

In the present embodiment, a calculation formula for the vehicle external noise power spectrum at the frequency f is taken as the following Formula (4-3).

$$\overline{W_f} = \frac{1}{12\pi\rho c^3} \int_S \overline{\left(\frac{\partial P(y,t)}{\partial t}\right)^2}_f S_{correlation}(y) dS(y) \quad (4\text{-}3)$$

Here, the frequency f components of the pressure variations are expressed by the following Formula (4-4). Note that the A and B in Formula (4-4) are amplitudes of the frequency f components of the pressure variations at the measurement point y on the surface of the vehicle model 20. Note also that, as is shown in Formula (10) (described below), because the acoustic intensity, which is the strength of the noise, changes in accordance with the amplitude of the pressure variations on the surface of the vehicle model 20 at the frequency f of the pressure variations, the frequency f of the pressure variations may be regarded as the frequency of the noise.

$$P(y,t)_f = A(y) \times \sin 2\pi ft + B(y) \times \cos 2\pi ft \quad (4\text{-}4)$$

By performing partial differentiation on the t in Formula (4-4), the following Formula (4-5) is obtained.

$$\left(\frac{\partial P(y,t)}{\partial t}\right)_f = 2\pi f \times A(y) \times \cos 2\pi ft - 2\pi f \times B(y) \times \sin 2\pi ft \quad (4\text{-}5)$$

Time averages (i.e., a time integration at a cycle of 1/f) of the pressure and pressure variations obtained using Formula (4-4) and Formula (4-5) can be calculated in the following manner.

$$\overline{P(y,t)_f^2} = \int_0^{1/f} [A(y) \times \sin 2\pi ft + B(y) \times \cos 2\pi ft]^2 dt \quad (4\text{-}6)$$

$$= \int_0^{1/f} [A(y)^2 \times (\sin 2\pi ft)^2 + B(y)^2 \times (\cos 2\pi ft)^2 + 2 \times A(y) \times B(y) \times \cos 2\pi ft \times \sin 2\pi ft] dt$$

$$= \int_0^{1/f} \left[A(y)^2 \times \frac{(1-\cos 4\pi ft)}{2} + B(y)^2 \times \frac{(1+\cos 4\pi ft)}{2} + A(y) \times B(y) \times \sin 4\pi ft\right] dt$$

$$\overline{\left(\frac{\partial P(y,t)}{\partial t}\right)^2}_f = \int_0^{1/f} [2\pi f \times A(y) \times \cos 2\pi ft - 2\pi f \times B(y) \times \sin 2\pi ft]^2 dt \quad (4\text{-}7)$$

$$= \int_0^{1/f} [4\pi^2 f^2 \times A(y)^2 \times (\cos 2\pi ft)^2 + 4\pi^2 f^2 \times B(y)^2 \times (\sin 2\pi ft)^2 - 2 \times 4\pi^2 f^2 \times A(y) \times B(y) \times \cos 2\pi ft \times \sin 2\pi ft] dt$$

$$= \int_0^{1/f} \left[4\pi^2 f^2 \times A(y)^2 \times \frac{(1+\cos 4\pi ft)}{2} + 4\pi^2 f^2 \times B(y)^2 \times \frac{(1-\cos 4\pi ft)}{2} - 4\pi^2 f^2 \times A(y) \times B(y) \times \sin 4\pi ft\right] dt$$

As is shown below in Formula (4-8), the time average of a trigonometric function is equivalent to 0.

$$\begin{cases} \int_0^{1/f} (\cos 4\pi ft) dt = 0 \\ \int_0^{1/f} (\sin 4\pi ft) dt = 0 \end{cases} \quad (4\text{-}8)$$

If the result of Formula (4-8) is substituted into Formula (4-6) and Formula (4-7), then the time average of the pressure and the time average of the pressure variations are expressed respectively by the following Formula (4-9) and Formula (4-10).

$$\overline{P(y,t)_f^2} = \int_0^{1/f} \frac{(A(y)^2 + B(y)^2)}{2} dt \quad (4\text{-}9)$$

$$\overline{\left(\frac{\partial P(y,t)}{\partial t}\right)^2}_f = 4\pi^2 f^2 \int_0^{1/f} \frac{(A(y)^2 + B(y)^2)}{2} dt \quad (4\text{-}10)$$

A relational formula for the time average of the pressure variations is shown by the following Formula (4-11).

$$\overline{\left(\frac{\partial P(y,t)}{\partial t}\right)^2}_f = 4\pi^2 f^2 \overline{P(y,t)_f^2} \quad (4\text{-}11)$$

Accordingly, the following Formula (5) can be obtained from the above Formula (4-3). Note that P (y, t)$_f$ with the attached overline in Formula (5) is the amplitude of the pressure variations on the surface of the vehicle model 20 at the frequency f.

$$\overline{W_f} = \frac{1}{12\pi\rho c^3} \int_S \overline{\left(\frac{\partial P(y,t)}{\partial t}\right)^2}_f S_{correlation}(y) dS(y) \quad (5)$$

$$= \frac{1}{12\pi\rho c^3} \int_S \overline{P(y,t)_f^2} 4\pi^2 f^2 S_{correlation}(y) dS(y)$$

$$= \frac{\pi}{3\rho c^3} \int_S \overline{P(y,t)_f^2} f^2 S_{correlation}(y) dS(y)$$

A vehicle external noise power distribution spectrum at the frequency f is defined as in the following Formula (6).

$$I_f(y) = \frac{\pi \overline{P(y,t)_f^2} f^2 S_{correlation}(y)}{3\rho c^3} \qquad (6)$$

As a result, a formula to calculate the vehicle external noise power spectrum at the frequency f is expressed by the following Formula (7).

$$\overline{W_f} = \int_S I_f(y) dS(y) \qquad (7)$$

Because the correlation area $S_{correlation}$ is proportional to a square of the correlation distance $L_{correlation}$, the relationship in the following Formula (8) is established.

$$I_f(y) = \frac{\pi f^2}{3\rho c^3} \overline{P(y,t)_f^2} S_{correlation}(y) \propto \frac{\pi f^2}{3\rho c^3} \overline{P(y,t)_f^2} L_{correlation}^2(y) \qquad (8)$$

Here, the correlation distance $L_{correlation}$ is expressed by the following Formula (9) using a surface flow velocity U (y) on the vehicle model 20. Note that U (y) with the attached overline in Formula (9) is the mean surface flow velocity at a predetermined time (for example, a time from 0 to 1/f).

$$L(y)_{correlation} \propto \frac{\overline{U}(y)}{f} \qquad (9)$$

If Formula (9) is substituted into Formula (8), then the vehicle external noise power distribution spectrum calculation formula shown by Formula (10), and the vehicle external noise power spectrum calculation formula shown by Formula (11) are obtained. As is shown in Formula (10), the vehicle external noise power distribution, which is the acoustic intensity, is proportional to a square of the sum of the mean surface flow velocity and the amplitude of the pressure variations at each position on the surface of the vehicle model. Accordingly, because the vehicle external power distribution changes in accordance with the amplitude of the pressure variations at the frequency f, the frequency f of the pressure variations can be regarded as frequency of the noise. Moreover, as is shown in Formula (11), the vehicle external noise power, which is the acoustic power, is calculated by performing surface integration on the vehicle external noise power distribution on the surface of the vehicle model 20.

$$I_f(y) = \frac{\pi f^2}{3\rho c^3} \overline{P(y,t)_f^2} \frac{\overline{U}(y)^2}{f^2} = \frac{\pi \overline{P(y,t)_f^2} \overline{U}(y)^2}{3\rho c^3} \qquad (10)$$

$$\overline{W_f} = \int_S I_f(y) dS(y) = \int_S \frac{\pi \overline{P(y,t)_f^2} \overline{U}(y)^2}{3\rho c^3} dS(y) \qquad (11)$$

Figure 3:
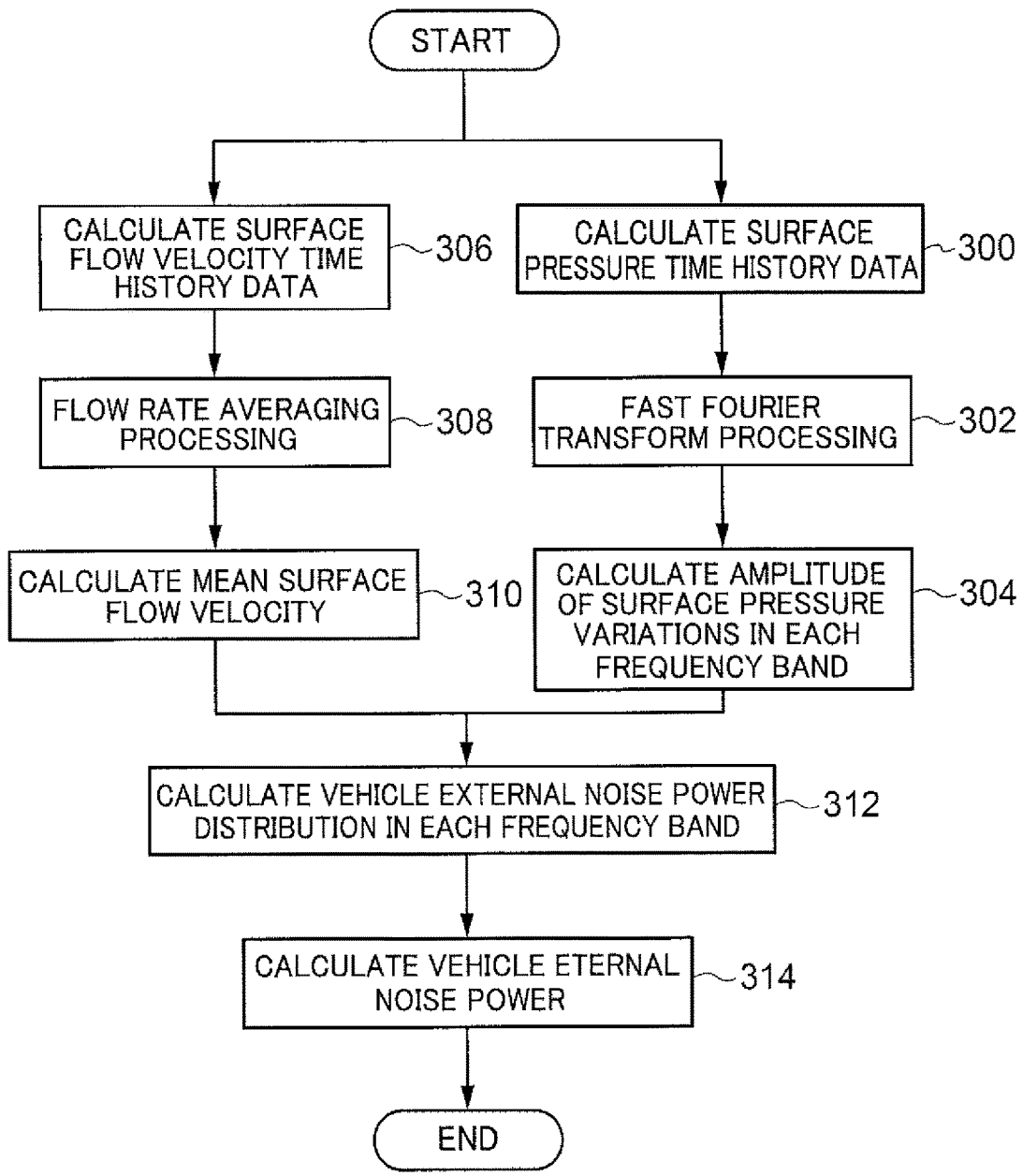
FIG. 3 is a flowchart showing an example of calculation processing for vehicle external noise power distribution and for vehicle external noise power in the noise detection device according to an embodiment of the present invention.

Next, the action and effects of the present embodiment will be described. FIG. 3 is a flowchart showing an example of the processing to calculate the vehicle external noise power distribution and the vehicle external noise power performed by the noise detection device 10 according to the present embodiment. In step 300, surface pressure time history data, which shows the changes over time (for example, the time from 0 to 1/f) in the pressure on the surface of the vehicle model 20, is calculated using CFD.

In step 302, fast Fourier transform processing is performed. In step 304, the amplitude of surface pressure variations, which are variations in the pressure on the surface of the vehicle model 20 in each frequency band, are calculated.

In step 306, surface flow velocity time history data, which shows changes over time in the flow rate of air on the surface of the vehicle model 20 is calculated using CFD. In step 308, flow rate averaging processing is performed, and in step 310, the mean surface flow velocity, which is the average flow rate of air on the surface of the vehicle model 20 is calculated.

In FIG. 3, the calculation of the amplitude of the surface pressure variations performed in steps 300 through 304, and the calculation of the mean surface flow velocity performed in steps 306 through 310 are executed as parallel processing, however, it is also possible to firstly perform the calculation of the amplitude of the surface pressure variations, and to subsequently perform the calculation of the mean surface flow velocity. Alternatively, it is also possible to firstly perform the calculation of the mean surface flow velocity, and to subsequently perform the calculation of the amplitude of the surface pressure variations. Note that the processing of steps 300 through 310 corresponds to an example of the processing performed by the numerical fluid dynamics processing unit of the present invention, and is processing that can be carried out by a CFD solver.

In step 312, the vehicle external noise power distribution (i.e., the acoustic intensity) in predetermined frequency bands is calculated at each surface pressure measurement point y using the calculation results from each of steps 304 and 310 and the above-described Formula (10). As an example, in the present embodiment the predetermined frequency bands are 500 Hz, 1 kHz, 2 kHz, and 4 kHz, however, it is also possible to calculate the vehicle external noise power distribution in different frequency bands from these.

In step 314, the vehicle external noise power in the predetermined frequency bands is calculated using the above-described Formula (11), and the processing sequence is then ended. The calculated vehicle external noise power in the respective frequency bands is expressed in either a table or a graph showing the separate frequency bands. As a result, it is possible to quantitatively and accurately evaluate size relationships in the wind noise surrounding the vehicle model 20. Note that the processing performed in step 312 through 314 corresponds to the processing that is performed in the claims by the acoustic strength calculation unit, and is executed by a program that calculates the strength of an acoustic source.

In the present embodiment, the acoustic intensity in each frequency band that was calculated for each measurement point y of the surface pressure calculated in step 312 in FIG. 3 is plotted on the vehicle model 20 in a CFD simulation. By doing this, it becomes possible to visualize the location of a noise source. FIG. 4 is a schematic view showing examples of the acoustic intensity in the respective frequency bands plotted on the surface of the vehicle model 20, and shows the acoustic intensity on the surface of the vehicle model 20 when the frequency is 500 Hz in (A), when the frequency is 1 kHz in (B), when the frequency is 2 kHz in (C), and when the frequency is 4 kHz in (D).

In FIG. 4, the color of the acoustic intensity is shown as darker in areas where the strength thereof is greater. As is shown in FIG. 4, by expressing the strength of the acoustic intensity using different colors, not only is it possible to specifically pinpoint the location of a noise source and to visualize this, but the acoustic intensity can also be specified quantitatively.

In FIG. 4(A) which shows the results when the frequency is 500 Hz, an area 28A where the acoustic intensity is conspicuous is generated at a bottom end of a front pillar 24 on the vehicle model 20. In addition, an area 28B where the acoustic intensity is conspicuous is also generated in an area near to a door mirror 26 and to the rear of a groove portion 24A located between the front pillar 24 and a side window 22A.

In FIG. 4(B) which shows the results when the frequency is 1 kHz, the area 28A has become smaller, however, the area 28B is still roughly the same size, and remains as a conspicuous noise source.

In FIG. 4(C) which shows the results when the frequency is 2 kHz, the area 28A has become markedly smaller, and the area 28B has also become significantly smaller. In FIG. 4 (D) which shows the results when the frequency is 4 kHz, neither of the areas 28A and 28B are observable, and no wind noise source can be regarded as existing when the frequency is 4 kHz. Accordingly, in the cases shown in FIG. 4, it can be inferred that the frequency bands where wind noise needs to be particularly improved are the 500 Hz and 1 kHz frequency bands.

As has been described above, in FIG. 4, the area 28A where the acoustic intensity is conspicuous is generated at the bottom end of the front pillar 24 on the vehicle model 20. Because it is thought that the area 28A is generated as a result of air flow layers peeling away at the bottom end of the front pillar 24, it is possible to predict that the wind noise can be improved by constructing countermeasures such as reducing any height differences at the bottom end of the front pillar 24.

Moreover, as is described above, the area 28B where the acoustic intensity is conspicuous is also generated in an area near to the door mirror 26 and to the rear of the groove portion 24A located between the front pillar 24 and the side window 22A. In this case, it is possible to predict that the wind noise can be improved by constructing countermeasures such as improving the width and shape of the groove portion 24A located between the front pillar 24 and the side window 22A, and improving the position and shape of the door mirror 26.

Moreover, in the present embodiment, based on the vehicle external noise power in each frequency band that is calculated in step 314 in FIG. 3, it is possible to pinpoint the frequency bands where wind noise needs to be improved. FIG. 5 is a conceptual view showing an example of the vehicle external noise power in the respective frequency bands calculated by the noise detection device 10 according to the present embodiment. In FIG. 5 the vehicle external noise power is conspicuous at a frequency of 500 Hz and at a frequency of 1 kHz. As is shown in FIG. 5, by creating a bar graph showing the vehicle external noise power in each frequency band, it is possible to pinpoint the frequency bands where wind noise needs to be improved.

As has been described above, according to the present embodiment, it is possible to quantitatively calculate the strength of a source of wind noise at each location on the surface of a vehicle.

What is claimed is:

1. A noise detection device comprising:
an input port that receives geometric data corresponding to a vehicle model that models an actual vehicle having fixed design specifications;
a numerical fluid dynamics processing unit that receives the vehicle model through the input port and, using a simulation in which the received vehicle model is made to run, calculates an amplitude of pressure variations generated on a surface of the vehicle model at each location on the surface of the vehicle model, and that also calculates a mean surface flow velocity, which is a time average at a predetermined time of a flow rate of a fluid on the surface of the vehicle model, for each position on the surface of the vehicle model;
an acoustic strength calculation unit that, based on the amplitude of the pressure variations at each location on the vehicle model surface and on the mean surface flow velocity at each location on the vehicle model surface that were each calculated by the numerical fluid dynamics processing unit, calculates an acoustic intensity for the respective locations on the vehicle model surface, and that, by performing surface integration on the calculated acoustic intensities on the vehicle model surface, calculates an acoustic power, which is a total energy of sound emitted from the actual vehicle modeled by the vehicle model, wherein for each location on the vehicle model surface, the acoustic strength calculation unit calculates a square of a sum of the amplitude of the pressure variations and the mean surface flow velocity at identical locations on the vehicle model surface, and based on the square of the sum of the amplitude of the pressure variations and the mean surface flow velocity calculated for each location on the vehicle model surface, calculates the acoustic intensity for each location on the vehicle model surface; and
an image processing unit that plots on the vehicle model surface the acoustic intensities at each location on the vehicle model surface that were calculated by the acoustic strength calculation unit and that displays on a display the acoustic intensities at each location on the vehicle model surface, so as to visualize the acoustic intensities at each location on the vehicle model surface.

2. The noise detection device according to claim 1, wherein the numerical fluid dynamics processing unit calculates the amplitude of the pressure variations at each location on the vehicle model surface in each one of predetermined frequency bands, and
the acoustic strength calculation unit calculates the acoustic intensity at each position on the vehicle model surface and the acoustic power generated on the vehicle model surface in each one of the predetermined frequency bands.

3. The noise detection device according to claim 1, wherein the respective locations on the vehicle model surface include a front window and a side window.

* * * * *